US 7,664,522 B2

(12) United States Patent
Stolle et al.

(10) Patent No.: US 7,664,522 B2
(45) Date of Patent: Feb. 16, 2010

(54) ADJUSTING A TRANSMIT POWER OF A SUBSCRIBER DEVICE OF A COMMUNICATION NETWORK BY A TRANSMIT/RECEIVE MEANS

(75) Inventors: Reinhard Stolle, Neufahrn (DE); Bernd Heise, Munich (DE)

(73) Assignee: Infineon Technologies AG, Munich (DE)

( * ) Notice: Subject to any disclaimer, the term of this patent is extended or adjusted under 35 U.S.C. 154(b) by 636 days.

(21) Appl. No.: 11/484,346

(22) Filed: Jul. 11, 2006

(65) Prior Publication Data

US 2007/0259680 A1 Nov. 8, 2007

(30) Foreign Application Priority Data

Apr. 12, 2006 (DE) .................. 10 2006 0172 52

(51) Int. Cl.
*H04Q 7/20* (2006.01)
(52) U.S. Cl. ............... 455/522; 455/69; 455/127.1; 455/500; 455/517; 455/466; 375/219; 375/220; 375/222; 375/260; 375/341; 379/27.01
(58) Field of Classification Search ........ 455/522, 455/69, 127.1, 466, 500, 517, 67.11, 557, 455/550.1, 73, 423–425; 375/219, 220, 222, 375/260, 341; 379/27.01
See application file for complete search history.

(56) References Cited

U.S. PATENT DOCUMENTS 6,922,448 B1 7/2005 Jacobsen et al.

| 7,072,449 B2* | 7/2006 | Tomilson ............... 379/27.01 |
| 2002/0163974 A1 | 11/2002 | Friedman |
| 2005/0220178 A1* | 10/2005 | Ginis ..................... 375/219 |
| 2006/0039550 A1* | 2/2006 | Chadha et al. ......... 379/406.09 |
| 2006/0062288 A1* | 3/2006 | Hester ..................... 375/222 |

FOREIGN PATENT DOCUMENTS

WO WO 03/098862 A1 11/2003

OTHER PUBLICATIONS

ITU-T Recommendation G.993.1, "Very high speed digital subscriber line", Jun. 2004, pp. 12, 117, 210-211 (4 pages).
ITU-T Recommendation G.993.2, "Very high speed digital subscriber line 2", Feb. 2006, pp. 36-37, 49-50, 149-170, 247 (27 pages).

(Continued)

*Primary Examiner*—Keith T Ferguson
(74) *Attorney, Agent, or Firm*—Maginot, Moore & Beck (57) ABSTRACT

A device for adjusting a transmit power spectrum of a subscriber device of a communication network, having a means for receiving an attenuation measure for an attenuation, which a signal experiences on its way from a transmit/receive means to the subscriber device of the communication network connected to the transmit/receive means, from the subscriber device, a means for determining a modified attenuation measure and shaping coefficients for a frequency-dependent shaping of the transmit power spectrum based on the attenuation measure determined by and received from the subscriber device, and a means for transferring the modified attenuation measure and the shaping coefficients to the subscriber device.

31 Claims, 5 Drawing Sheets

OTHER PUBLICATIONS

ITU-T Recommendation G.997.1, "Physical layer management for digital subscriber line (DSL) transceivers", May 2003, pp. 39, 42, 60, 101-103 (6 pages).

T1E1.Apr. 2003- 210R1, "Very-high-bit-rate Digital Subscriber Line (VDSL) Metallic Interface", ANSI T1.424, 2004, pp. 18-19, 130 (3 pages).

TS 101 270-1 V2.0.10, "Transmission and Multiplexing (TM); Access transmission systems on metallic access cables; Very high speed Digital Subscriber Line (VDSL); Part 1: Functional requirements", May 2003, pp. 28-29, 46, (3 pages).

* cited by examiner

ADJUSTING A TRANSMIT POWER OF A SUBSCRIBER DEVICE OF A COMMUNICATION NETWORK BY A TRANSMIT/RECEIVE MEANS

CROSS-REFERENCE TO RELATED APPLICATION

This application claims priority from German Patent Application No. 102006017252.3, which was filed on Apr. 12, 2006, and is incorporated herein by reference in its entirety.

BACKGROUND

The present invention relates to adjusting a transmit power spectrum of a subscriber device of a communication network by a transmit/receive means of the communication network, as it is for example required in DSL technology (DSL=digital subscriber line).

Due to the plurality of pairs of wires in a telephone cable from a central office (CO) to connected subscribers or subscriber devices, respectively, crosstalk occurs despite a direct current insulation of the pairs of wires, both near-end crosstalk (NEXT) and also far-end crosstalk (FEXT). The same result from capacitive or inductive couplings. By twisting the individual pairs of wires of a cable, this crosstalk is minimized so far that it may be neglected in the voice band. In data transmission technology, like e.g. DSL technology, however, apart from the voice band further frequency ranges are used, in which this crosstalk has a very strong effect on the possible range and transmission speed.

Near-end crosstalk means, that a transmitter on the "near side" of a receive device, i.e. both receive device and also transmitter are part of different subscriber terminal devices or both receive device and also transmitter are part of the central office, overcouples transmit signal portions into the receive branch of the receive device.

In contrast to that, far-end crosstalk means, that, in addition to the receive signal determined for the same, sent from a far-end first transmitter, i.e. first transmitter and receiver are on different sides of subscriber and central office side, a receiver receives portions of a second transmit signal sent from a far-end second transmitter, i.e. also second transmitter and receiver are on different sides.

In an xDSL network, wherein "x" stands for different implementations of DSL technology, the subscriber devices (CPE=customer premises equipment) are typically in a different distance from the central office (CO). A so called near-far problem results from this. If all subscriber devices of the network transmitted with the same transmit power spectral density (TX-PSD, transmit power spectral density), the CPEs closer to the CO would respectively couple a high amount of crosstalk into the lines of the CPE further away from the CO and thus cause differently strong interference power spectral densities of the individual subscribers.

For this reason, within the scope of VDSL standardization (VDSL=very high speed digital subscriber line), a so called upstream power back-off (UPBO) is defined. This is a method for determining the transmit power spectral densities (TX-PSDs) of subscribers on pairs of wires of different lengths in a multiple-pair communication table, such that the interference power spectral density caused by each pair of wires comprises the same value due to far-end crosstalk (FEXT-PSD) at the CO.

For performing the UPBO method as a standard the steps discussed in the following are performed during a training phase during a connection setup between CO and CPE. At the beginning of a training phase, the CO transfers standard signals to be presented to the CPE. The same may for example contain information about a signal power with which signals were transmitted from the CO, default values with regard to a power with which the upstream signals sent from the CPE are to arrive at the CO, and also shaping coefficients ($A_i$, $B_i$) for frequency bands i for a frequency-dependent shaping of the spectral transmit power density of the CPE. Using these parameters, in a first step by the CPE power parameters of the physical connecting passage between CO and CPE are determined. Here, for example, at the CPE a receive signal strength is determined and using the information about the original central-side transmit power of the signals from the CPE a measure $kl_0$ for the attenuation is estimated, which the signals experience on the way from the CO to the CPE. Using this knowledge, on the subscriber side a transmit power may be determined such that the signals reach the CO as accurately as possible with the power requested from the CO. Values for this requested receive power or receive power spectral density, respectively (RX-PSD), may for example be given by a network operator for example via network management adjustments. In a further step of the training phase, the attenuation ratio is transmitted from the CPE to the CO.

The indicated standards thus define a UPBO method which approximates the request for a respectively equal interference power density of the pairs of wires at the CO by realizing the respectively equal receive power spectral density. By this approximation, subscribers on shorter lines cause a lower FEXT-PSD than subscribers on longer lines. This disadvantage could be prevented by a frequency-dependent correction of the TX-PSD on the subscriber side.

BRIEF SUMMARY

Embodiments of the present invention include a device for adjusting a transmit power spectrum of a subscriber device of a communication network, having a means for receiving an attenuation measure $kl_0$ for an attenuation, experienced by a signal on its way from a transmit/receive means to the subscriber device of the communication network connected to the transmit/receive device, from the subscriber device, a means for determining a modified attenuation measure $kl_0'$ and shaping coefficients ($A_i'$, $B_i'$) for a frequency-dependent shaping of the transmit power spectrum based on the attenuation measure $kl_0$ determined by and received from the subscriber device, and a means for transferring the modified attenuation measure $kl_0'$ and the shaping coefficients ($A_i'$, $B_i'$) to the subscriber device.

Further embodiments of the present invention include a subscriber device for a communication network comprising a central office, having a transmit/receive modem comprising an adjustable transmit power spectrum for a communication with the central office, a state machine for passing an initialization phase of a communication protocol with the central office, wherein the state machine is coupled to the transmit/receive modem and comprises a first state for anticipating a receipt of a test signal from the central office via the transmit/receive modem, a second state for determining an attenuation measure based on the test signal and a transmission of the determined attenuation measure to the central office via the transmit/receive modem, a third state for anticipating a receipt of transmit power spectrum shaping coefficients ($A_i'$, $B_i'$) or transmit power spectrum shaping coefficients ($A_i'$, $B_i'$) and a modified attenuation measure ($kl_0'$) from the central office via the transmit/receive modem and passing on the same to the transmit power spectrum adjustment output, and state transitions, through which up to the complete passage of the initialization phase, among the first to third states the third state is passed through last, and a transmit power spectrum adjuster for adjusting the transmit power spectrum of the transmit/receive modem on the basis of the transmit power spectrum shaping coefficients ($A_i'$, $B_i'$) or the transmit power spectrum shaping coefficients ($A_i'$, $B_i'$) and the modified attenuation measure $kl_0'$.

BRIEF DESCRIPTION OF THE SEVERAL VIEWS OF THE DRAWINGS

In the following, embodiments of the present invention are explained in more detail with reference to the accompanying drawings, in which.

DETAILED DESCRIPTION

Figure 1:
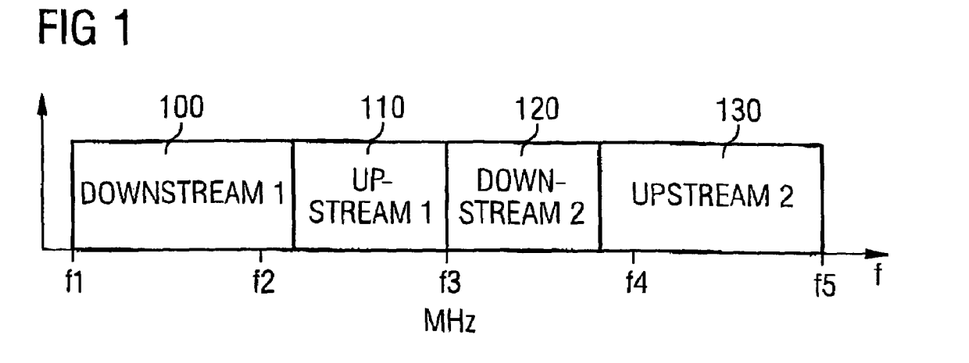
FIG. 1 shows a schematical illustration of a VDSL frequency plan.

FIG. 1 shows the division of the frequency spectrum into individual bands according to the VDSL standard, to make the following embodiments for the UPBO scenario clearer, for example relating to VDSL or VDSL2, respectively, and in particular to simplify the understanding according to which criteria the values ($A_i'$, $B_i'$) and $kl_0'$ are determined in embodiments of the present invention.

FIG. 1 shows an illustration of a relevant frequency range which is divided into four different subfrequency bands. The division of the frequency range corresponds to that of the VDSL transmission technology. A first frequency range 100 defines a frequency band for the downstream, i.e. the transmission direction from CO to CPE. A second higher-frequency frequency range 110 defines a first frequency band for the upstream data transmission, i.e. the direction from CPE to CO. A next higher-frequency frequency range 120 forms a second frequency subband for the downstream data transmission. Finally, the highest-frequency frequency range 130 forms a second frequency subband for the downstream data transmission. Of course, the present invention is also applicable with other transmission technologies apart from VDSL, in particular ones with more upstream and downstream bands, as it for example occurs in VDSL2, where for downstream and upstream currently respectively up to three frequency bands are used. As it may be seen from the bandwidths of the individual subbands, in the respective subbands differently high transmission rates may be obtained. Thus, for example in the upstream frequency band 130 (US2 or i=2, respectively), higher data rates may be obtained than in the upstream frequency band 110 (US1 or i=1, respectively). The respectively used bandwidths within the subbands US1 (i=1) and US2 (i=2) depend on the respective line attenuation between CO and CPE.

Discrete multitone transmission (DMT) is the designation for the modulation method used in VDSL. DMT is a multi-carrier method, in which the bit information is encoded onto several carrier frequencies for data respectively comprising a certain bandwidth. The serial data stream to be transmitted is combined at the transmit side in DMT to a respective number of bits and mapped to complex subsymbols by inverse spectral transformation, which are sent in parallel on many neighboring carriers. For this purpose, they are simultaneously modulated onto the available carrier frequencies whose sum signal is then transmitted. The carriers may be adjusted to be differently strong. By this it becomes possible to compensate the non-ideal frequency response of concrete telephone lines. Each carrier may be modulated with another bit density, depending on how noisy it is. For example, the carriers with lower frequencies, where the interferences are usually less, may be modulated with a higher data rate, the carriers with a higher frequency with a correspondingly lower data rate. In extreme cases, individual carriers may also be completely blocked.

Figure 2:
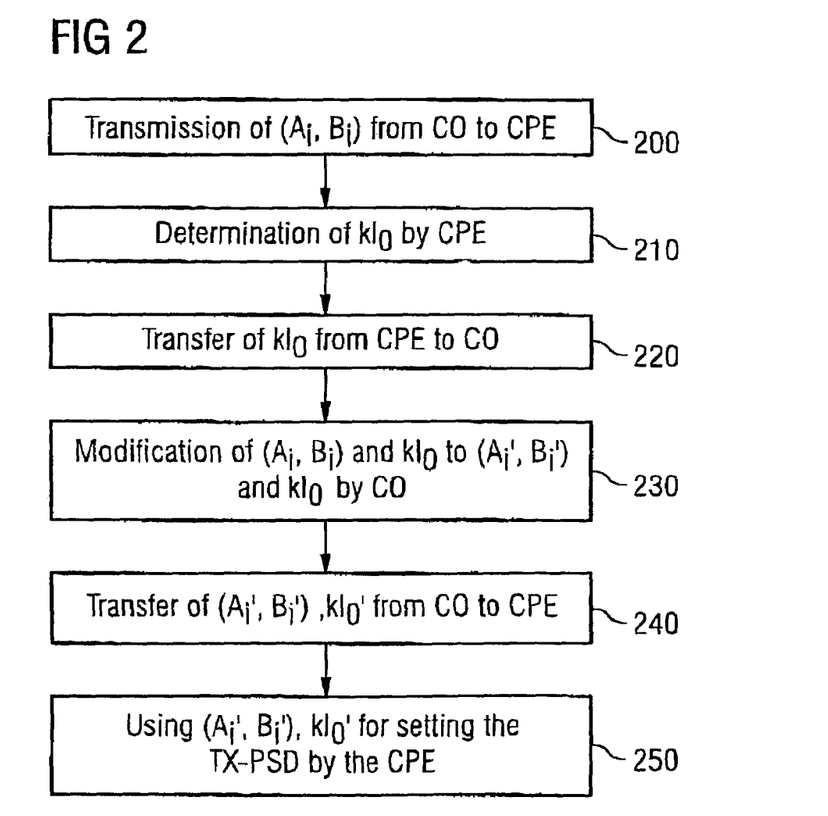
FIG. 2 shows a flow chart for illustrating a method for adjusting the transmit power density of the subscriber devices according to an embodiment of the present invention.

FIG. 2 shows a flow chart for illustrating a procedure for adjusting the transmit power density of a subscriber device CPE wirelessly connected to a central transmit/receive means or CO, respectively, according to an embodiment of the present invention.

In a first step 200, shaping coefficients ($A_i$, $B_i$) for a frequency-dependent shaping of the transmit power spectrum of the CPE are sent from the CO to the respectively connected CPE for any frequency bands i, i.e. for example US1 and US2. In a second step 210, the attenuation coefficient $kl_0$ is determined by the CPE. This is performed by the CO transmitting a pre-known signal to the CPE via the respective pair of wires during a training phase, whose receive spectrum is calibrated by the CPE in order to estimate information therefrom about the original central office-side transmit power of the signals $kl_0$. In a subsequent step 220, the determined attenuation coefficient $kl_0$ is transmitted from the CPE to the CO. In a fourth step 230, the CO modifies, based on the attenuation coefficient $kl_0$ received from the CPE, only the shaping coefficients ($A_i$, $B_i$) to ($A_i'$, $B_i'$), or the shaping coefficients ($A_i$, $B_i$) to ($A_i'$, $B_i'$) and the attenuation coefficient $kl_0$ to $kl_0'$. In the following, in a next step 240, the modified shaping coefficients ($A_i'$, $B_i'$) or the modified shaping coefficients ($A_i'$, $B_i'$) and the modified attenuation coefficient $kl_0'$, respectively, are transferred from the CO to the CPE. Finally, in a step 250, the CPE uses the shaping coefficients ($A_i'$, $B_i'$) or the modified shaping coefficients ($A_i'$, $B_i'$) and the modified attenuation coefficient $kl_0'$ transmitted to the same and modified by the CO for adjusting its TX-PSD, as it is described in more detail in the following. Thus, the UPBO method is completed, and the CPE from hereon uses the PSDUPBO adjusted according to FIG. 2.

Figure 3:
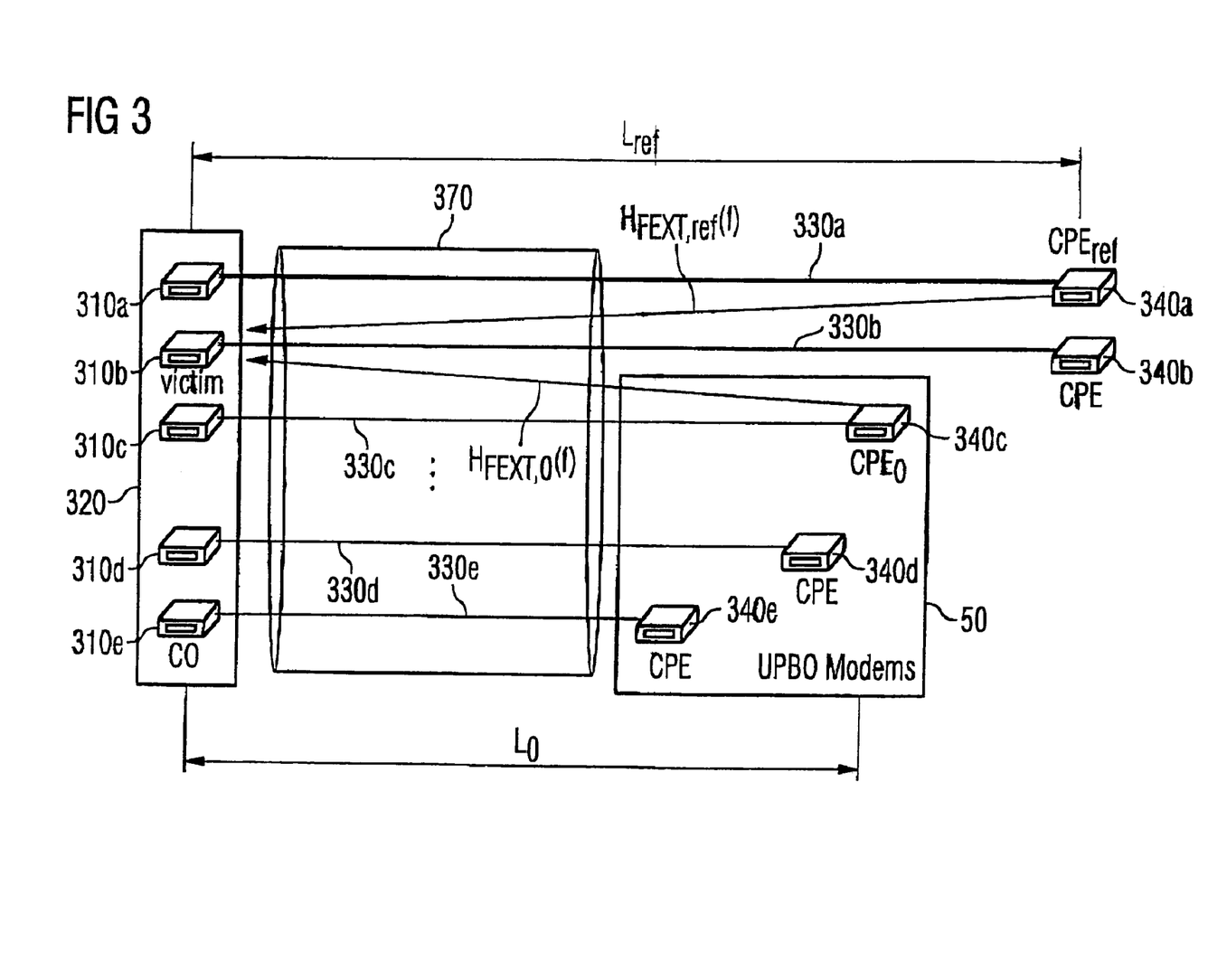
FIG. 3 shows a schematical illustration of a VDSL network, in which embodiments of the present invention may be implemented.

FIG. 3 shows a VDSL network as an example for an application of a UPBO method according to an embodiment of the present invention. Each of a plurality of modems 310 of a central office 320 (CO) is connected to a different one of a plurality of different subscriber devices or terminal devices 340, respectively, via one of a plurality of wire pair lines 330 of different lengths. A longest line 330a indicated thicker in FIG. 3, forms a reference line with a length $L_{ref}$. A subscriber device 340, i.e. $CPE_0$, is in a distance $L_0$ from the central office 320. A further subscriber device 340, i.e. $CPE_{ref}$, is as an example also in the distance $L_{ref}$ to the central office 320. As, as indicated by the reference numeral 370 in FIG. 3, any wire pairs are located in a multiple-pair cable bundle 370, in the upstream, i.e. the communication in the direction from the subscriber devices 340 to the CO 320, the already described far-end crosstalk results (FEXT). This is illustrated as an example in FIG. 3 for a line 330b of the subscriber device 340b. The transmit signal of the subscriber 340c, i.e. $CPE_0$, couples with a transmission function $H_{FEXT,0}(f)$ at a length $L_0$ over onto line 330b of the subscriber 340b. Further, the transmit signal of the subscriber 340a $CPE_{ref}$ couples across the complete line length $L_{ref}$ with the transmission function $H_{FEXT,ref}(f)$ over onto line 330b of the subscriber 340b.

Although this is not indicated in FIG. 3, each modem 310 of the CO 320 and each subscriber device 340 of the network of FIG. 3 includes a transmitter, a receiver and a processor, wherein the functioning and the interaction of those internal components and thus also the functioning of the modems 310 and the devices 340 themselves in connection with the setting or adjustment, respectively, of the transmit power density or the upstream power back-off, respectively, may be seen from the following description. It is the aim of the upstream power back-off (UPBO), to reduce the far-end crosstalk of the shorter VDSL lines 330c-330e to the longer ones 330a, 330b. If all subscribers 340a-e transmitted using the same transmit power spectral density, the far-end crosstalk of the shorter to the longer lines would substantially affect the data transmission via the longer lines. Assuming the subscriber $CPE_{ref}$ transmitted with a maximum transmit power spectral density $PSD_{VDSL}(f)$, then its transmit signal would be substantially attenuated across the line length ($L_{ref}-L_0$). In a distance $L_0$ from the CO, now the signal of subscriber $CPE_0$ would start to couple over into the line of the subscriber $CPE_{REF}$. If now the subscriber $CPE_0$ also transmitted with a maximum transmit power spectral density $PSD_{VDSL}(f)$, then its transmit power spectral density in the distance $L_0$ to the CO would be substantially higher than the one of the already attenuated signal of the subscriber $CPE_{ref}$. I.e., the far-end crosstalk of the subscriber $CPE_0$ onto the subscriber $CPE_{ref}$ is higher than the far-end crosstalk of the subscriber $CPE_{ref}$ to the subscriber $CPE_0$. By the greater interference on the line of the subscriber $CPE_{ref}$, thus only a low data rate may be offered to the same as compared to the subscriber $CPE_0$. In order to prevent this or to be able to offer the same data rate to all subscribers, the subscribers 340c-e connected to the CO using shorter lines and emphasized using a frame 350 in FIG. 3 have to reduce their transmit power spectral density, so that the request for a respectively equal interference power spectral density of the wire pairs 330a-330e at the CO 320 may be achieved. This decrease of the transmit power spectral density of the respective subscribers is—as already described—referred to as upstream power back-off UPBO.

The FEXT transmission function $H_{FEXT,ref}(f)$ across the frequency f of the reference line 330a and $H_{FEXT,0}(f)$ of one of the lines 330c-e to be formed (UPBO lines), i.e. one of the lines which are shorter than the reference length $L_{ref}$, and for which for this reason at the respectively connected subscriber device the above-indicated adaptation of the transmit power is to be performed, is proportional to the transmission function $H_{ref}(f)$ or $H_0(f)$, respectively, and to length $L_{ref}$ or $L_0$, respectively, of the respective line 330a or 330c-330e:

$$|H_{FEXT,ref}(f)|^2 \sim L_{ref}|H_{ref}(f)|^2 \tag{1}$$

$$|H_{FEXT,0}(f)|^2 \sim L_0 \cdot |H_0(f)|^2. \tag{2}$$

The FEXT-PSD resulting from the far-end crosstalk from the reference line 330a onto the line of the subscriber 340b which the receiver of the exemplarily regarded "sacrificial"-modem 310b obtains, is given by $$W_{FEXT,ref}(f) = W_{VDSL}(f) \cdot |H_{FEXT,ref}(f)|^2 \tag{3}$$

Here, $W_{VDSL}(f)$ designates the fully controlled VDSL upstream spectrum, i.e. the maximum transmit power density of the subscriber devices 340. A similar connection holds true for the far-end crosstalk of the interfering subscriber $CPE_0$ onto the line of the subscriber 330b.

$$W_{FEXT,0}(f) = W_{UPBO}(f) \cdot |H_{FEXT,0}(f)|^2 \tag{4}$$

Here, $W_{UPBO}(f)$ designates the VDSL upstream spectrum of the subscriber $CPE_0$, including UPBO. I.e., $W_{UPBO}(f)$ is the sought-for transmit power spectral density of the subscriber $CPE_0$ after adjusting considering the existing line length.

As already mentioned above, the request for a respectively equal interference power spectral density of all wire pairs 330a-e is to be fulfilled at the CO 320, i.e. the induced interference power spectral density of the transmitter of a subscriber 340 with a shorter line length than $L_{ref}$, like e.g. of 340c, should not exceed the interference power spectral density $W_{FEXT,ref}(f)$ of the transmitter of the subscriber $CPE_{ref}$. Expressed mathematically, this means $$W_{FEXT,0}(f) \leq W_{FEXT,ref}(f). \tag{5}$$

Using few algebraic conversions, now as a request for the sought-for transmit power spectral density the following results $$W_{UPBO}(f) \leq W_{VDSL}(f) \frac{L_{ref}}{L_0} \cdot \left|\frac{H_{ref}(f)}{H_0(f)}\right|^2 \tag{6}$$

The ratio of the line lengths $L_0/L_{ref}$ is considered, in order to consider the length dependency of the FEXT interferences. Regarding the connections between spectral line attenuation a(f) and transmission function H(f) or between spectrum W and spectrum PSD in dB $$a(f) = -20 \cdot \log_{10}|H(f)| \text{dB} \tag{7}$$

$$PSD = (10 \cdot \log_{10}(W) + 30) \frac{\text{dB}m}{\text{Hz}}, \tag{8}$$

respectively, the regulation for determining the UPBO transmit power spectral density in the logarithmic scale to $$PSD_{UPBO}(f) \leq PSD_{VDSL}(f) - a_{ref}(f) + \tag{9}$$
$$10 \cdot \log_{10}(a_{ref}(f_{ref})) +$$
$$a_0(f) - 10 \cdot \log_{10}(a_0(f_{ref}))$$

results.

The difference of the two logarithmic line attenuations at a certain reference frequency $f_{ref}$ includes the respective line lengths $L_{ref}$ and $L_0$ into the determination of the UPBO transmit power density spectrum $USD_{UPBO}$ to be determined, as the line attenuations substantially are proportional to the respective line lengths. As it may be seen from the following description of the UPBO method, the bottom part including the two last terms, designated in the following by L(f), of the last equation is determined during the activation phase or training phase, respectively, of the VDSL connection by the subscriber modem $CPE_0$, while the top part of the right-hand part of the equation on the CO side, is configured, like e.g. via a management information base or an application program interface MIB/API which is not shown in FIG. 3 but connected to the CO, and designates the reference power density spectrum of the reference line of the length $L_{ref}$. Using the abbreviations $$PSD_{ref}(f) = PSD_{VDSL}(f) - \alpha_{ref}(f) + 10 \cdot \log_{10}(\alpha_{ref}(f_{ref})) \quad (10)$$

$$L(f) = \alpha_0(f) - 10 \cdot \log_{10}(\alpha_0(f_{ref})) \quad (11)$$

the UPBO transmit power density spectrum for the upstream frequency band i may be written as $$PSD_{UPBO,i}(f, kl_0) = PSD_{ref,i}(f) + L(f, kl_0). \quad (12)$$

This regulation is used by the subscriber devices 340 to adjust their transmit power densities within the scope of a shaping functionality to $PSD_{UPBO}$, according to step 250 of FIG. 2.

In the following it is assumed as an example that the subscriber devices 340 within the scope of the shaping functionality for example configure the reference PSD $PSD_{ref,i}(f)$ for the frequency band i in the form of $$PSD_{ref,i}(f) = A_i - B_i \sqrt{f} \quad (13)$$

in step 250, wherein $A_i$ and $B_i$ are shaping coefficients for a frequency-dependent shaping of the transmit power spectrum $PSD_{ref,i}(f)$, which may be transmitted within the scope of the connection setup to the subscriber devices from the CO 320, i.e. for example per transmission band i.

L(f) designates the loss function and is defined as $$L(kl_0, f) = kl_0 \sqrt{f} \quad (14)$$

or determined or measured, respectively, by the subscriber devices 340 within the scope of the connection setup in step 210 and approximated using the indicated equation in order to obtain the attenuation value $kl_0$.

In the calculation of the UPBO transmit power density spectrum according to equation (12)-(14), the ratio of the line lengths $L_0/L_{ref}$ is not considered. In order to consider the length dependency of the FEXT interferences, the ideal UPBO transmit power density spectrum should be calculated according to $$PSD_{UPBO,ideal,i}(f, kl_0) = PSD_{UPBO,i}(f, kl_0) - 10 \cdot \log\left(\frac{kl_0}{kl_{ref}}\right). \quad (15)$$

The term $\log_{10}$ may be realized via a suitable selection of correction values of $A_i$, $B_i$ and $kl_0$. Equation 15 may now be transformed using the equations 12-14 to be $$-A_i' - B_i' \cdot \sqrt{f} + kl_0' \cdot \sqrt{f} = PSD_{ref,i}(f) + kl_0 \cdot \quad (16)$$
$$\sqrt{f} - 10 \cdot \log\left(\frac{kl_0}{kl_{ref}}\right),$$

wherein $A_i'$, $B_i'$ and $kl_0'$ respectively represent the correction values of the shaping coefficients $A_i$, $B_i$ for the reference PSD and the attenuation coefficient $kl_0$ determined by the CPE 340. The index i designates used upstream frequency bands.

With a reference frequency vector $f_i = [f_{0,i}, f_{1,i}, \ldots, f_{N-1,i}]^T$ having the length N, wherein the reference frequencies $f_{0,i}, f_{1,i}, \ldots, f_{N-1,i}$ for example correspond to the carrier frequencies used within the subbands i=1 (US1) or i=2 (US2) for the DMT method, and a vector $PSD_{ref,i} = [PSD_{ref}(f_{0,i}), PSD_{ref}(f_{1,i}), \ldots, PSD_{ref}(f_{N-1,i})]^T$, the modified values $A_i'$, $B_i'$ and $kl_0'$ for the frequency band i result as a solution of the linear equation system $$\begin{pmatrix} -1 & -\sqrt{f_{0,i}} \\ \vdots & \vdots \\ -1 & -\sqrt{f_{N-1,i}} \end{pmatrix} \cdot \begin{pmatrix} A_i' \\ B_i' - kl_0' \end{pmatrix} = PSD_{ref,i} + kl_0 \cdot \sqrt{f_{ref,i}} - \quad (17)$$
$$10 \cdot \log_{10}\left(\frac{kl_0}{kl_{ref}}\right)$$

Here, the addition of the scalar $-10 \cdot \log_{10}(kl_0/kl_{ref})$ to the vector $kl_0 \cdot \sqrt{f_{ref,i}}$ corresponds to the addition of $-10 \cdot \log_{10}(kl_0/kl_{ref})$ to each component of $kl_0 \cdot \sqrt{f_{ref,i}}$. The solution of equation (17) takes place in step 230 of FIG. 2 by the CO. In principle, this equation system may be solved, if the reference frequency vector $f_{ref,i}$ comprises at least two reference frequencies. In order to obtain a more accurate approximation to the desired transmit power density spectrum $PSD_{UPBO,ideal,i}(f)$, however, a greater number of reference frequencies is advantageous. If the following holds true $$F_i = \begin{pmatrix} -1 & -\sqrt{f_{0,i}} \\ \vdots & \vdots \\ -1 & -\sqrt{f_{N-1,i}} \end{pmatrix}, \quad (18)$$

in general as a solution for the modified shaping coefficients $A_i'$, $B_i'$ and the modified attenuation measure $kl_0'$ for the frequency band i as a solution in general the following results $$\begin{pmatrix} A_i' \\ B_i' - kl_0' \end{pmatrix} = (F_i^T F_i)^{-1} \cdot F_i^T \cdot \quad (19)$$
$$\left[ PSD_{ref,i} + kl_0 \cdot \sqrt{f_{ref,i}} - 10 \cdot \log_{10}\left(\frac{kl_0}{kl_{ref}}\right) \right],$$

wherein the expression $(F_i^T F_i)^{-1} \cdot F_i^T$ corresponds to the so-called pseudo inverse of the $(2 \times N)$ matrix $F_i$. The solution of the linear equation system according to equation 19 thus represents a so-called least squares solution.

Obviously, the solution $(B_i' - kl_0')$ may be randomly divided to $kl_0'$ and $B_i'$. The division may advantageously take place so that $kl_0'$ and $B_i'$ maintain standard value ranges of the used communication protocol between CO and CPE. Apart from that, the division should take place such that for one $kl_0'$ any $B_i'$ for any used frequency bands maintain the standard value ranges, as $kl_0$ may currently only be corrected in a frequency-independent way. This request would not have to be met anymore, for example, if a frequency-dependent correction of $kl_0$ was possible.

According to a further embodiment of the present invention, in step 230 of FIG. 2 a modification of the attenuation measure $kl_0$ may be omitted and the regulation for calculating the modified shaping coefficients is simplified to be $$\begin{pmatrix} A'_i \\ B'_i \end{pmatrix} = (F_i^T F_i)^{-1} \cdot F_i^T \cdot \left[ PSD_{ref,i} - 10 \cdot \log_{10}\left(\frac{kl_0}{kl_{ref}}\right) \right]. \quad (20)$$

In this case, only the modified shaping coefficients $A_i'$ and $B_i'$ for the frequency band i, after calculating the same, have to be transmitted from the CO to the CPE in step 240 of FIG. 2.

The standards G.993.1 and G.993.2 hitherto only allow a frequency-independent correction of the attenuation coefficients or the electrical length $kl_0$, respectively, for example using the message "O-UPDATE" provided in the ITU standards G.993.2 and G.997.1. Using this message it is possible for the CO, to determine a certain attenuation coefficient $kl_0$ or $kl_0'$ for the subscriber device. Directly after the standardized training phase, thus even before the actual initialization of the connection, the "O-UPDATE" message is used for example to transmit a $kl_0$ modified by the CO to the CPE.

The shaping coefficients $(A_i, B_i)$ for the transmit frequency range i used for a frequency-dependent indication of the transmit power density spectrum $PSD_{ref,i}(f)$ of the CPE may currently not be corrected within the scope of the initialization according to the above standards. According to one embodiment it is provided to communicate the correction of the shaping coefficients $(A_i, B_i)$ in step 230 by the message "O-UPDATE" (ITU G.993.2) from the CO to the CPE, which thus has an extended function.

The table illustrated in the following is a possible extension of the message "O-UPDATE". The table shows a description of the message "O-UPDATE" of the ITU standard G.993.2 extended by the field name 8 (in bold letters).

| | field name | format |
|---|---|---|
| 1 | message descriptor | message code |
| 2 | final electrical length $kl_0$ or $kl_0'$ | 2 bytes |
| 3 | updated upstream PSD ceiling (MAXMASKus) | 2 bytes |
| 4 | highest allowed upstream sub-carrier | 2 bytes |
| 5 | lowest allowed upstream sub-carrier | 2 bytes |
| 6 | BLACKOUTus set | bands descriptor |
| 7 | timing advance correction | 2 bytes |
| 8 | final parameters for UPBO reference PSD (UPBOPSD) | UPBOPSD descriptor |

After that, the possible extended message "O-UPDATE" consists of eight elements, whose content or meaning, respectively, is indicated in the middle column, while the left column indicates the order of occurrence of those data elements at the CPE and the right column indicates the reserved number of bits or bytes, respectively, or the syntax element names for the respective data elements.

The frequency-independent correction of the attenuation coefficient or the electrical length $kl_0$, respectively, by the CO is performed in the message "O-UPDATE" according to the ITU standard G.993.2 via field 2. As already mentioned above, also an extension to a frequency-dependent correction of the attenuation coefficient is possible.

The shaping coefficients $(A_i', B_i')$ modified in step 230 by the CO may for example be formatted using the same "UPBOPSD descriptor", which is already used in the first transmission of the original shaping coefficients $(A_i, B_i)$ in step 200 during the training phase using the so-called message "O-SIGNATURE" according to ITU G.993.2. The "UPBOPSD descriptor" is illustrated for a better understanding in the following table.

| octet | field content |
|---|---|
| 1 | number of US bands: $n_{US}$ |
| 2-4 | Bits 0-11: value of A' for US1 |
| | Bits 12-23: value of B' for US1 |
| 5-7 (if required) | Bits 0-11: value of A' for US2 |
| | Bits 12-23: value of B' for US2 |
| ... | ... |
| $3 * n_{US} - 1, 3 * n_{US} + 1$ | Bits 0-11: value of A' for US($n_{US}$) |
| | Bits 12-23: value of B' for US($n_{US}$) |

By the first eight bits, i.e. the first octet, of the "UPBOPSD descriptor", the number $n_{us}$ of the used upstream frequency bands is given. By the second to fourth octet of the "UPBOPSD descriptor" the values $(A_1', B_1')$ for the US1 band are transmitted, wherein twelve bits are used for $A_1'$ and $B_1'$, respectively. By the fifth to seventh octet of the "UPBOPSD descriptor" the values $(A_2', B_2')$ for the US2 band are transmitted, wherein twelve bits are used for $A_2'$ and $B_2'$, respectively, etc.

According to a further embodiment of the present invention, also a new standard definition of an update message for the shaping coefficients $(A_i, B_i)$ is possible, like for example "O-UPDATE2". This message "O-UPDATE2" might for example contain a subset of the fields indicated below the message "O-UPDATE" and be transmitted in step 240 from the CO to the CPE. Basically, this subset might for example consist of the new field 8 indicated below "O-UPDATE", i.e. the "UPBOPSD descriptor". Here, the initialization phase thus consists of steps 200 to 240.

According to a further embodiment of the present invention, further, updating the shaping coefficients $(A_i, B_i)$ might be performed by a repeated execution of the initialization phase and accordingly of steps 200 to 220 instead of step 240. In addition, the CO might terminate the initialization phase of the transmission protocol including steps 200 to 240 with the CPE after receiving the attenuation measure $kl_0$ from the subscriber device in step 220 and determining the shaping coefficients $(A_i', B_i')$ or the shaping coefficients $(A_i', B_i')$ and the modified attenuation measure $kl_0'$, i.e. after step 230, to start the initialization phase again subsequently using step 200 and to transfer the modified shaping coefficients $(A_i', B_i')$ or the modified shaping coefficients $(A_i', B_i')$ and the modified attenuation measure $kl_0'$ in step 200 of the newly started initialization to the CPE. In the second pass of the initialization, then, for example, the steps 230 and 240 may be omitted. All in all, here a first part of the initialization phase consists of steps 200 to 230 and a second part consists of steps 200 to 220, before subsequently all parameters may be used by the CPE in step 250.

A repeated initialization is preferably to be generated at the earliest after a state of determining the attenuation measure $kl_0$ based on a test signal and transmitting the determined attenuation measure $kl_0$ to the central office, as only after that the measured $kl_0$ is known to the central office. In addition to that, preferably the initialization is resumed at the latest before the message "O-SIGNATURE", as this time modified shaping coefficients $(A_i', B_i')$ are to be transmitted via this message. Within the VDSL2 initialization, the ITU standard G.993.2 defines a so-called "Channel Discovery Phase". Within this "Channel Discovery Phase", the CO and the CPE exchange messages. The attenuation coefficient $kl_0$ determined by the CPE is for example transmitted from the CPE in the message "R-MSG1" to the CO. As the ITU standard G.993.2 currently allows no leap-back within the initialization, according to the current situation, only forcing a termination of the initialization using a measure remains which prevents a successful completion of the initialization procedure. For example, the CO could stop transmitting after a successful receipt of the message "R-MSG1", so that the connection again falls back into an original state after a so called time-out. This means, that not only the "Channel Discovery Phase", but also a so-called handshake standing at the beginning of the connection between CO and CPE, are completely repeated. The CO could thus transmit the modified shaping coefficients ($A_i'$, $B_i'$) for example using the message "O-SIGNATURE" to the CPE. In this embodiment of the present invention, the existing VDSL2 standard would not have to be modified and existing subscriber devices or CPEs, respectively, could be used.

Of course, any changes of the methods hitherto used in the standards are possible, like for example a message enabling a leap-back to the state "O-SIGNATURE". The leap-back takes place in an embodiment after the state which transmits the attenuation coefficient $kl_0$ from the CPE to the CO, and a leap-back is performed to the state transmitting the shaping coefficients ($A_i$, $B_i$) from the CO to the CPE. In embodiments of the present invention it is not critical how many other states are also repeated. Typically, here, the parameters and information transmitted in the other states are identical to those of the first passage.

After above details of the network of FIG. 3 and the mathematical basics were explained, in the following embodiments of central offices or subscriber devices, respectively, according to the present invention are explained.

Figure 4:
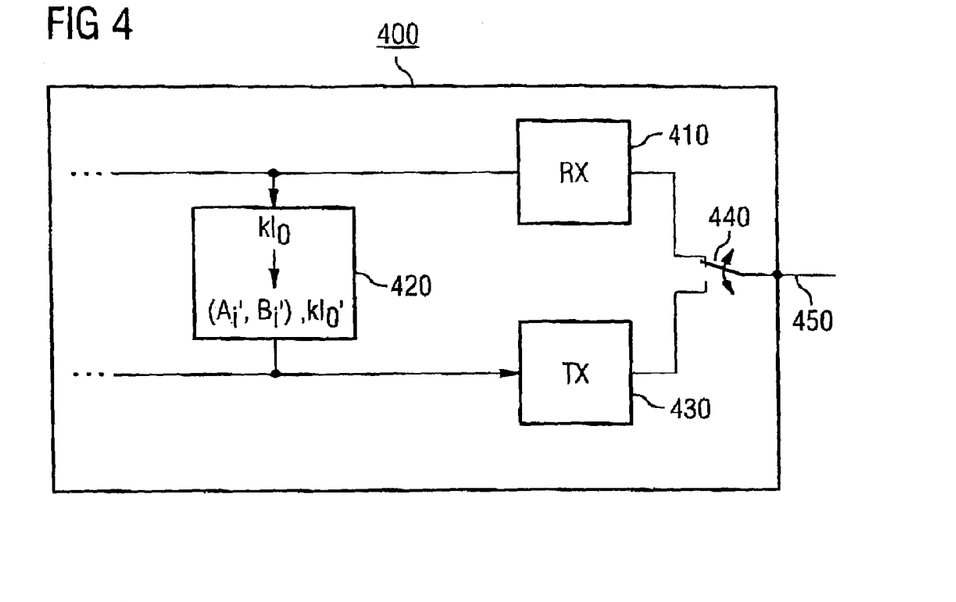
FIG. 4 shows a schematical block diagram of a device for adjusting a transmit power spectrum of a subscriber device of a communication network according to an embodiment of the present invention.

FIG. 4 shows a device for adjusting a transmit power spectrum of a subscriber device of a communication network according to an embodiment of the present invention.

FIG. 4 shows a device 400 for adjusting a transmit power spectrum of a subscriber device having a receiver unit or receiver 410 configured to receive an attenuation measure $kl_0$, a processor 420 configured to determine modified shaping coefficients ($A_i'$, $B_i'$) or modified shaping coefficients ($A_i'$, $B_i'$) and a modified attenuation measure $kl_0'$, and a transfer unit 430 for transferring the modified shaping coefficients ($A_i'$, $B_i'$) or the modified shaping coefficients ($A_i'$, $B_i'$) and the modified attenuation measure $kl_0'$. Further, the receiver 410 and the transfer unit 430 are coupled via a switch 440 to a line 450.

If an attenuation coefficient $kl_0$ was determined by a CPE not illustrated in FIG. 4, then the same is transferred using a suitable message, for example the message "R-MSG1", via line 450 to the receiver 410. From there, the attenuation measure $kl_0$ is passed on to the processor 420 for determining the modified shaping coefficients ($A_i'$, $B_i'$) for a frequency-dependent shaping of the transmit power spectrum of the CPE or the shaping coefficients ($A_i'$, $B_i'$) and the modified attenuation measure $kl_0'$ based on the attenuation measure determined by the subscriber device and received by the receiver 410. The determination of the modified shaping coefficients ($A_i'$, $B_i'$) and the modified attenuation measure $kl_0'$ takes place according to the above-described process. After the modified shaping coefficients ($A_i'$, $B_i'$) or the modified shaping coefficients ($A_i'$, $B_i'$) and the modified attenuation measure $kl_0'$ were determined by the processor 420, the same are passed on to transfer unit 430 to be transferred via line 450 by means of a suitable message of a transfer protocol to the subscriber device.

The transfer of the modified parameters may, as described above, either be performed via suitable update messages regarding a consisting connection between CO and CPE or using a termination of an initialization phase of a connection between CO and CPE and a subsequent restart of the initialization phase.

Figure 5:
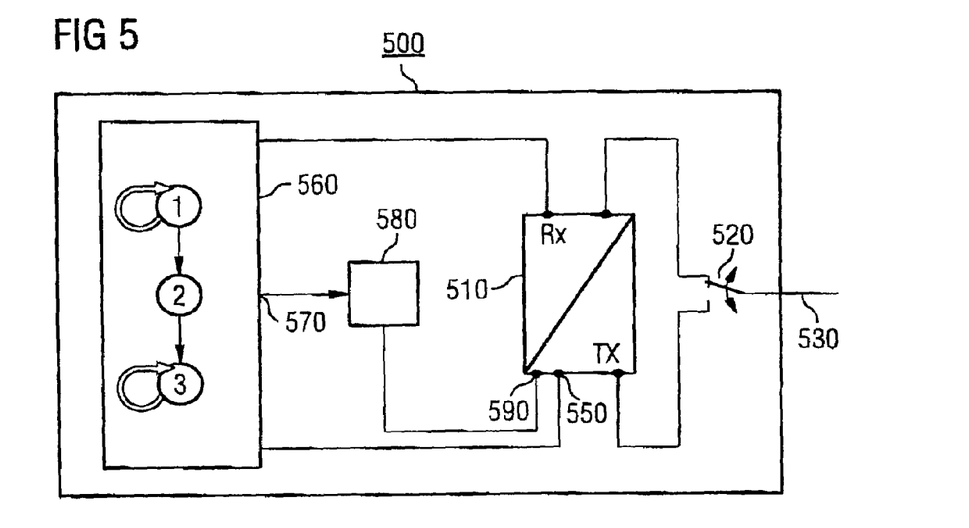
FIG. 5 shows a schematical block diagram of a subscriber device according to an embodiment of the present invention.

FIG. 5 shows a schematical block diagram of an embodiment of a subscriber device according to the present invention.

FIG. 5 shows a subscriber device 500 having a transmit/receive modem 510 which is coupled to a line 530 via transmit/receive changeover switch. The transmit/receive modem is coupled to a state machine 560 both via receive data output 540 and also a transmit data input 550. The state machine 560 comprises an output 570 to which a transmit power spectrum adjuster 580 is coupled. Further, the transmit power spectrum adjuster 580 is coupled to a transmit power spectrum adjustment input 590 of the transmit/receive modem 510.

Via the transmit/receive modem 510 and the line 530, the subscriber device 500 exchanges data with a central office (CO) not illustrated in FIG. 5. For this purpose, the transmit/receive modem 510 is controlled via the state machine 560 of the subscriber device 500. For an initialization phase of the connection between the subscriber device 500 and a central office, the state machine 560 for example comprises a first state of anticipating a receipt of a test signal from the central office, a second state of determining the attenuation measure $kl_0$ based on the test signal received from the central office and of transmitting the determined attenuation measure $kl_0$ to the central office via the transmit data input 550 of the transmit/receive modem 540 and a third state of anticipating the receipt of shaping coefficients ($A_i'$, $B_i'$) or shaping coefficients ($A_i'$, $B_i'$) and the modified attenuation measure $kl_0'$ from the central office (for example via a modified message "O-SIGNATURE") and passing on the same to the transmit power spectrum adjuster 580 via the transmit power spectrum adjustment output 570. The transmit power spectrum adjuster 580 controls, using the information about the shaping coefficients ($A_i$, $B_i$) and the attenuation measure $kl_0$, the transmit/receive modem 510, so that the same transmits data to the central office with the desired transmit power density spectrum $PSD_{UPBO}$.

Figure 6:
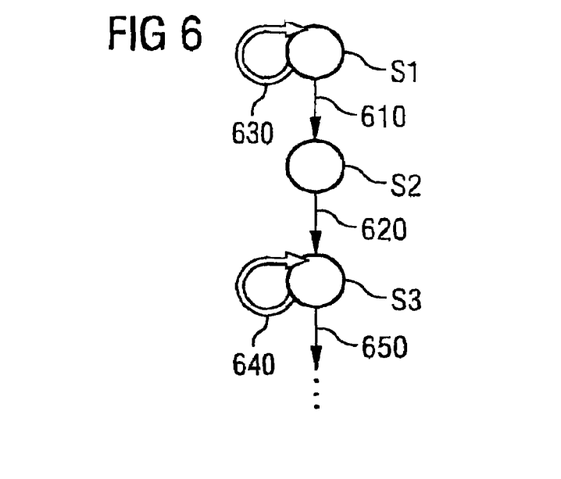
FIG. 6 shows a simplified state diagram according to a state machine in a subscriber device according to an embodiment of the present invention.

FIG. 6 shows a schematical illustration of a state diagram of three states of the state machine 560 of the subscriber device 500.

For a measured exchange with a central office during an initialization phase of a connection setup between the central office and the subscriber device 500, the state machine 560 of the subscriber device 500 comprises a state S1, a state S2 and a state S3. Further, the states S1 and S2 are coupled to each other by a state transition 610 and the states S2 and S3 by a state transition 620. The state S1 comprises a state transition 630 to itself, like the state S3 comprises a state transition 640 to itself. Further, the initialization phase may be exited using a state transition 650 starting from state S2.

The state S1 designates a state of anticipating a receipt of a test signal from the central office. As long as this test signal is not received, the state machine 560 again and again returns into state S1, as is indicated by arrow 630. As soon as the test signal was received by the central office, the state machine changes from state S1 into state S2 using the transition 610, in which based on the received test signal the attenuation measure $kl_0$ is determined and transmitted to the central office, for example using the message "R-MSG1". After the successful transmission of the attenuation measure to the central office, the state machine changes from S2 via the transition 620 into state S3. The state S3 indicates a state of anticipating the receipt of modified transmit power spectrum shaping coefficients ($A_i'$, $B_i'$) or modified transmit power spectrum shaping coefficients ($A_i'$, $B_i'$) and a modified attenuation measure $kl_0'$, respectively, from the central office, for example via a message "O-SIGNATURE". As long as those modified parameters are not received by the central office, the state machine 560 will again and again return to state S3, at it is indicated by the arrow 640 in FIG. 6. After the receipt of the modified parameters from the central office, state S3 is exited via the state transition 650 and thus a change from the initialization phase into a normal operation is performed.

If, as described above, the update of the shaping coefficients ($A_i'$, $B_i'$) is achieved by a repeated execution of an initialization phase, then the state S3 in the state machine of the subscriber device is not required. Here, the state machine is again set into an initial state not shown in FIG. 6 by the CO after a completed termination of the initialization phase. A state of anticipating the shaping coefficients ($A_i$, $B_i$) or ($A_i'$, $B_i'$), respectively, during the initialization phase (not shown in FIG. 6) is in a time course before the state S1 of anticipating the receipt of a test signal from the central office. The state S3 may be required in each embodiment of the present invention, in which the modified shaping coefficients ($A_i'$, $B_i'$) or the modified shaping coefficients ($A_i'$, $B_i'$) and the modified attenuation coefficient $kl_0'$ are transferred in an update phase of an existing connection between CO and CPE.

In the following, it is to be described with reference to FIGS. 7 and 8, which form and variation the transmit power density spectrums which are adjustable at the subscriber device using the method comprise as compared to desired transmit power density spectrums predetermined by a network operator for example via network management adjustments.

Figure 7:
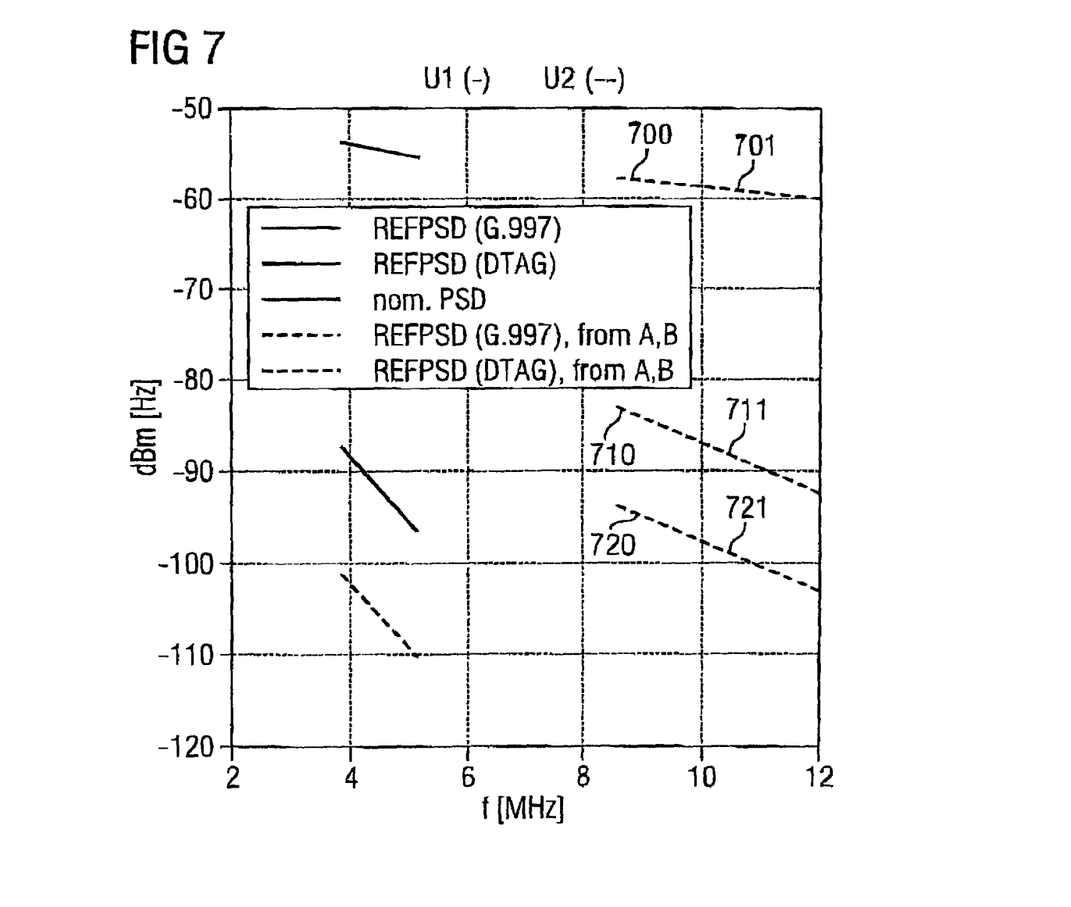
FIG. 7 shows an illustration of UPBO transmit power density spectrums achieved according to an embodiment of the present invention in different frequency bands as compared to desired transmit power density spectrums.

FIG. 7 shows an illustration and a comparison of transmit power density spectrums predetermined by a communication system for the frequency bands US1 and US2 and different attenuation coefficients $kl_0$.

The right-hand part of FIG. 7 all in all shows six UPBO-PSDs for the US2 band. The UPBO-PSD designated by reference numeral 700 indicates a desired or ideal UPBO-PSD, respectively, for $kl_0=12$ dB, predetermined by the system and adjusted to the network of FIG. 3. The UPBO-PSD for $kl_0=12$ dB adjusted by the modified shaping coefficients ($A_2'$, $B_2'$) or by the modified shaping coefficients ($A_2'$, $B_2'$) and the modified attenuation measure $kl_0'$, is in this illustration basically identical with the desired UPBO-PSD 700 and is designated by the reference numeral 701. The desired UPBO-PSD for $kl_0=6$ dB is designated by 710. It may be seen from FIG. 7, that the UPBO-PSD for $kl_0=6$ dB 711 adjusted according to the procedure according to an embodiment of the present invention is substantially also identical to the desired UPBO-PSD 710. The same connection holds true for the desired UPBO-PSD 720 for $kl_0=0$ dB and the UPBO-PSD 721 adjusted according to the procedure according to an embodiment of the present invention.

The left-hand part of FIG. 7 shows the effect of the modified shaping coefficients ($A_1'$, $B_1'$) on the lower band US1. It may be seen that the difference of the desired reference power density spectrums and the transmit power density spectrums approximated by the procedure according to an embodiment of the present invention is negligible.

Figure 8:
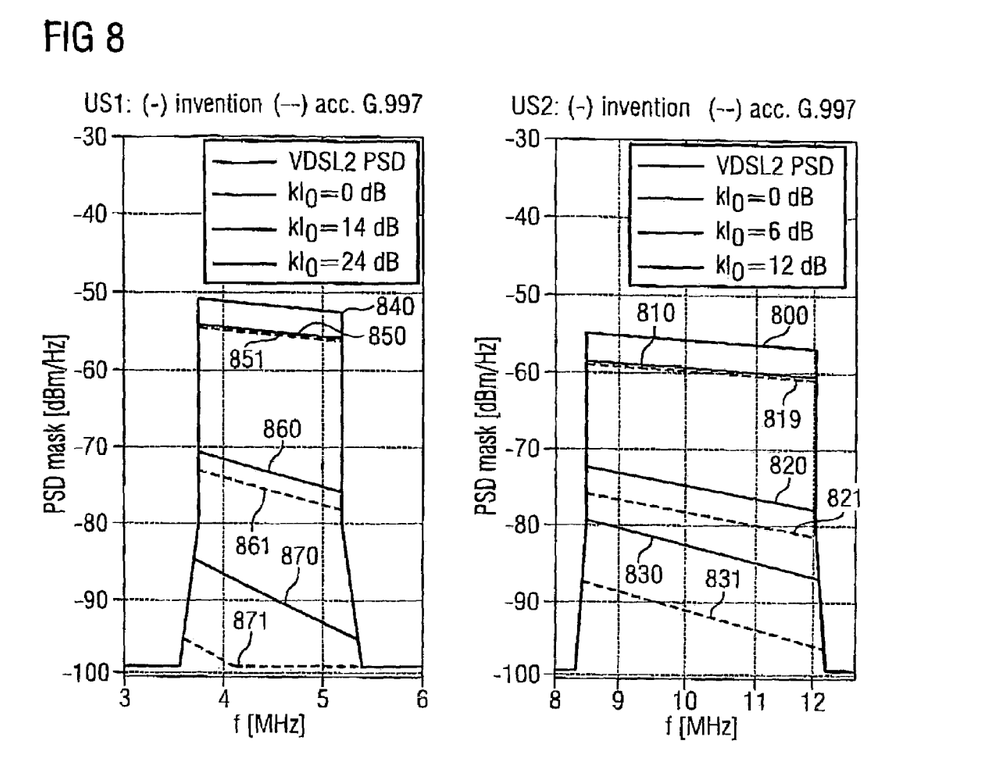
FIG. 8 shows an illustration of UPBO transmit power density spectrums in different frequency bands achieved according to an embodiment of the present invention.

FIG. 8 shows selected UPBO-PSDs based on modified shaping coefficients ($A_i'$, $B_i'$) or modified shaping coefficients ($A_i'$, $B_i'$) and modified attenuation coefficients $kl_0'$ and compares the same to UPBO-PSDs obtained according to the ITU standard G.997.

The right-hand part of FIG. 8 all in all shows seven UPBO-PSDs for the band US2. The UPBO-PSD designated by reference numeral 800 represents a desired or ideal, maximum $PSD_{VDSL}$, respectively, predetermined by the system and adjusted to the network of FIG. 3. The $PSD_{UPBO,2}$ for $kl_0=12$ dB adjusted by the procedure according to an embodiment of the present invention is designated by the reference numeral 810, wherein a $PSD_{UPBO,2}$ for $kl_0=12$ dB adjusted according to the standard G.997 is designated by the reference numeral 811. The $PSD_{UPBO,2}$ for $kl_0=6$ dB adjusted by the procedure according to an embodiment of the present invention is designated by the reference numeral 820. Accordingly, the standard $PSD_{UPBO,2}$ for $kl_0=6$ dB is designated by 821. Further, 830 designates the $PSD_{UPBO,2}$ for $kl_0=0$ dB and 831 the standard $PSD_{UPBO,2}$ for $kl_0=0$ dB adjusted according to the procedure according to an embodiment of the present invention.

Accordingly, the left-hand part of FIG. 8 shows all in all seven UPBO-PSDs for the band US1. The UPBO-PSD designated by the reference numeral 840 indicates a desired, maximum $PSD_{VDSL}$ for the frequency band US1 predetermined by the system and adjusted to the network of FIG. 3. The $PSD_{UPBO,1}$ for $kl_0=24$ dB adjusted by the procedure according to an embodiment of the present invention is designated by the reference numeral 850 in the left-hand part of FIG. 8. The $PSD_{UPBO,1}$ for $kl_0=24$ dB adjusted according to the standard ITU G.997 has the reference numeral 851. Further, the $PSD_{UPBO,1}$ for $kl_0=14$ dB adjusted by the procedure according to an embodiment of the present invention is designated by the reference numeral 860, whereas the $PSD_{UPBO,1}$ adjusted according to the standard G.997 for $kl_0=14$ dB is designated by 861. Finally, a $PSD_{UPBO,1}$ for $kl_0=0$ dB adjusted by procedure according to an embodiment of the present invention has the reference numeral 870, and accordingly a $PSD_{UPBO,1}$ adjusted for $kl_0=0$ dB according to the standard ITU G.997 comprises the reference numeral 871.

Both, the left and also the right part of FIG. 8, partially show clear differences between the UPBO-PSDs adjusted according to standard and the UPBO-PSD adjusted according to the procedure according to one embodiment of the present invention. Due to the fact, that in the standard determination of UPBO-PSDs the line lengths are not considered in the calculation of the transmit power spectral densities, the transmit power densities adjusted according to standard are always below the determined UPBO transmit power densities. From this it becomes clear that a subscriber whose UPBO-PSD was determined according to the procedure according to one embodiment of the present invention, may be provided with a higher transmit power and thus a higher data rate.

The above-described embodiments of the present invention achieve a better adjustment to the frequency response of the desired transmit power density spectrum $PSD_{ref}(f)$, by using a shaping functionality of the subscriber device, according to which the subscriber device may adjusted a $PSD_{ref}(f)$ predetermined by the coefficients ($A_i'$, $B_i'$), if applicable with additional consideration of the modified attenuation value $kl_0'$ after a determination of modified shaping coefficients ($A_i'$, $B_i'$) for an upstream frequency band i by the central office. Here, the CPE determines the form of the transmit power density spectrum $PSD_{ref,i}(f)$ by $PSD_{ref,i}(f) = -A_i - B_i * \sqrt{f}$. By the modification of the shaping coefficients ($A_i$, $B_i$) or the shaping coefficients ($A_i$, $B_i$) and the attenuation coefficient $kl_0$, wherein the modification is dependent on the line length $L_0$ of the considered subscriber $CPE_0$ with regard to a reference line length $L_{ref}$ typically corresponding to the line length of the farthest subscriber $CPE_{ref}$, the frequency course of the obtained UPBO-PSD is not changed as compared to the desired power density spectrum $PSD_{VDSL}(f)$ preset by the original shaping coefficients ($A_i$, $B_i$).

Thus, embodiments of the present invention have the advantage, that with each frequency used for the communication between central office and subscriber device, a best possible optimization of the spectral transmit power density may be achieved.

It is a further advantage of the above-described embodiments of the present invention, that a network operator of a communication network is enabled to offer exactly the same data rate to all subscribers connected to its central office independent of the implementation of the subscriber devices.

The procedure according to an embodiment of the present invention assumes a first configuration of the transmit power spectral density for each frequency range i, which is performed as a standard by the CO in the initialization phase of the connection via a protocol according to standard, before an attenuation coefficient $kl_0$ becomes known by the CPE. Within the initialization phase, the attenuation coefficient $kl_0$ is determined according to standard by the CPE and transferred from the subscriber side to the central office side within the scope of the initialization phase. The CO now determines, with the help of the estimated attenuation coefficient $kl_0$, modified parameter pairs ($A_i'$, $B_i'$) or modified parameter pairs ($A_i'$, $B_i'$) and a modified attenuation coefficient $kl_0'$, which are transferred via a suitable message from the CO to the CPE. The determination may, as described above, for example be achieved via update messages. A further possibility of transfer is for example a determination of the initialization phase after the attenuation coefficient $kl_0$ was successfully transferred from the CPE to the CO, a termination of the modified parameter pairs ($A_i'$, $B_i'$) or the modified parameter pairs ($A_i'$, $B_i'$) and the modified attenuation coefficient $kl_0'$, respectively, and a subsequent re-start of the initialization phase to transfer the modified parameters to the CPE.

Thus, embodiments of the present invention have the advantage that also with subscriber devices according to standard the request for equal interference power density of the pairs of wires may be reduced or met as accurately as possible, respectively.

Further advantages of the above embodiments of the present invention are that by the same a temporal delay in the course of an initialization of a connection between CO and CPE may be prevented. A time-consuming repetition of the connection setup with modified shaping coefficients for a frequency-dependent shaping of the transmit power spectrum is not absolutely necessary.

In summary, according to embodiments of the present invention a request for a respectively equal interference power density of the subscriber devices is met by the fact that the shaping coefficients ($A_i$, $B_i$) for a frequency-dependent shaping of the transmit power spectrum are modified by the CO based on the attenuation coefficient $kl_0$ determined by and received from the subscriber device. In order to be able to maintain value ranges of the above-mentioned standard predetermined by of the shaping coefficients ($A_i$, $B_i$) for a frequency band i for the standard communication protocol, in addition, the attenuation coefficient $kl_0$ determined by the subscriber side may additionally be modified on the side of the central office.

The attenuation coefficient $kl_0$ is estimated within the scope of the VDSL activation by the subscriber side CPE and transferred to the central office CO. The central office determines, based on this estimate of the attenuation coefficient $kl_0$, only modified shaping coefficients ($A_i'$, $B_i'$) of a frequency band i of the communication system or modified shaping coefficients ($A_i'$, $B_i'$) and a modified attenuation coefficient $kl_0'$ and causes the CPE to use only the modified shaping coefficients ($A_i'$, $B_i'$) or the modified shaping coefficients ($A_i'$, $B_i'$) and the modified attenuation coefficient $kl_0'$ instead of the shaping coefficients ($A_i$, $B_i$) originally transferred in the initialization phase or the training phase, respectively, and the attenuation coefficient $kl_0$ estimated thereupon by the subscriber device. The modification of the shaping coefficients ($A_i$, $B_i$) and the attenuation coefficient $kl_0$ is here performed such that a frequency response of the UPBO-PSD resulting from the modification at the CPE for example corresponds to an ideal frequency response predetermined by a network operator for example via network management adjustments with any carrier frequencies of a used frequency band i. That means, after the modification of the shaping coefficients ($A_i$, $B_i$) and the attenuation coefficient $kl_0$ to modified shaping coefficients ($A_i'$, $B_i'$) and attenuation coefficients $kl_0'$, in a complete used frequency band i, basically or to a desired extent, an equality of the UPBO transmit power density spectrum desired by the network operator for example via network management adjustments and the achieved UPBO transmit power density spectrum (UPBO-PSD) of the subscriber device may be obtained.

In particular, it is to be noted, that depending on the conditions, the inventive scheme may also be implemented in software. The implementation may take place on a digital storage medium, in particular a floppy disc or a CD having electronically readable control signals which may cooperate with a programmable computer system so that the corresponding method is performed. In general, the invention thus also consists in a computer program product having a program code stored on a machine-readable carrier for performing the inventive method, when the computer program product runs on a computer. In other words, the invention may thus be realized as a computer program having a program code for performing the method, when the computer program product runs on a computer. It is further to be noted that the steps in FIG. 2 may also be regarded as individual means of the CPE or the CO, respectively, taking over the corresponding function and for example implemented as software in FPGA or an ASIC circuit component.

Further, it is to be noted, that the term "modem" is to be regarded comprehensively and includes in its general form a device, an interface or a program which serves for transferring information, for example via cable lines.

Although the embodiments were described with reference to VDSL communications, other embodiments may refer to other types of data communication, for example to other xDSL communications, like ADSL or HDSL.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A device for adjusting a transmit power spectrum of a subscriber device of a digital subscriber line communication network, comprising:

a receiver configured to receive from the subscriber device an attenuation measure for an attenuation experienced by a signal transmitted via the digital subscriber line communication network from a transmitter/receiver to the subscriber device;

a processor configured to determine a modified attenuation measure and shaping coefficients for a frequency-dependent shaping of the transmit power spectrum based on the attenuation measure received from the subscriber device; and a transfer unit configured to transfer the modified attenuation measure and the shaping coefficients to the subscriber device.

2. The device according to claim 1, wherein the processor is further configured to determine the shaping coefficients and the modified attenuation measure based on a reference attenuation and a reference power spectrum.

3. The device according to claim 1, wherein the processor is further configured to determine the shaping coefficients and the modified attenuation measure of each frequency band of a plurality of frequency bands.

4. The device according to claim 1, wherein the processor is further configured to determine the shaping coefficients and the modified attenuation measure at least in part by solving an equation system according to $$\begin{bmatrix} -1 & -\sqrt{f_{ref,0,i}} \\ \vdots & \vdots \\ -1 & -\sqrt{f_{ref,N-1,i}} \end{bmatrix} \cdot \begin{bmatrix} A'_i \\ B'_i - kl'_0 \end{bmatrix} = U + kl_0 \cdot \sqrt{f_{ref,i}} - 10 \cdot \log\left(\frac{kl_0}{kl_{ref}}\right)$$

wherein $kl_0$ corresponds to the attenuation measure received from the subscriber device, $kl_0'$ corresponds to the modified attenuation measure and $A_i'$ and $B_i'$ correspond to the shaping coefficients, and wherein $kl_{ref}$ corresponds to a reference attenuation and $f_{ref,i}=[f_{ref,0,i}, f_{ref,1,i}, \ldots, f_{ref,N-1,i}]^T$ to a reference frequency vector of a plurality of reference frequencies $(f_{ref,0,i}, f_{ref,1,i}, \ldots, f_{ref,N-1,i})$, and $U=[UPBOPSD(f_{ref,0,i}), UPBOPSD(f_{ref,1,i}), \ldots, UPBOPSD(f_{ref,N-1,i})]^T$ corresponds to a vector of values of a reference power spectrum at the reference frequencies of the plurality of reference frequencies.

5. The device according to claim 1, wherein the transfer unit includes a terminator configured to terminate an initialization phase of a transfer protocol with the subscriber device after receiving the attenuation measure from the subscriber device.

6. A device for adjusting a transmit power spectrum of a subscriber device of a digital subscriber line communication network, comprising:

a receiver configured to receive from the subscriber device an attenuation measure for an attenuation experienced by a signal transmitted via the digital subscriber line communication network from a transmitter/receiver to the subscriber device;

a processor configured to determine shaping coefficients for a frequency-dependent shaping of the transmit power spectrum based on the attenuation measure received from the subscriber device; and a transfer unit configured to transfer the shaping coefficients to the subscriber device, the shaping coefficients to be used by the subscriber device in connection with the attenuation measure for adjusting the transmit power spectrum.

7. The device according to claim 6, wherein the processor is further configured to determine the shaping coefficients based on a reference attenuation and a reference power spectrum.

8. The device according to claim 6, wherein the processor is further configured to determine the shaping coefficients for each frequency band of a plurality of frequency bands.

9. The device according to claim 6, wherein the processor is further configured to determine the shaping coefficients at least in part by solving a linear equation system according to $$\begin{bmatrix} -1 & -\sqrt{f_{ref,0,i}} \\ \vdots & \vdots \\ -1 & -\sqrt{f_{ref,N-1,i}} \end{bmatrix} \cdot \begin{bmatrix} A'_i \\ B'_i - kl'_0 \end{bmatrix} = U + kl_0 \cdot \sqrt{f_{ref,i}} - 10 \cdot \log\left(\frac{kl_0}{kl_{ref}}\right)$$

wherein $kl_0$ corresponds to the attenuation measure determined by and received from the subscriber device and $A_i'$ and $B_i'$ correspond to the shaping coefficients, and wherein $kl_{ref}$ corresponds to a reference attenuation and $f_{ref,i}=[f_{ref,0,i}, f_{ref,1,i}, \ldots, f_{ref,N-1,i}]^T$ corresponds to a reference frequency vector of a plurality of reference frequencies $(f_{ref,0,i}, f_{ref,1,i}, \ldots, f_{ref,N-1,i})$ and $U=[UPBOPSD(f_{ref,0,i}), UPBOPSD(f_{ref,1,i}), \ldots, UPBOPSD(f_{ref,N-1,i})]^T$ to a vector of values of a reference power spectrum at the reference frequencies of the plurality of reference frequencies.

10. The device according to claim 6, wherein the transfer unit includes a terminator configured to terminating an initialization phase of a transfer protocol with the subscriber device after receiving the attenuation measure from the subscriber device, to subsequently restart the initialization phase, and to transfer the shaping coefficients.

11. A central office arrangement, comprising:

a transmit/receive modem comprising a transmit data input, a receive data output and an external interface capable of being coupled to a subscriber device via a line; and a transmit power spectrum adjuster comprising an input coupled to the receive data output and an output coupled to the transmit data input, wherein the transmit power spectrum adjuster is operable to, responsive to receiving an attenuation measure from the receive data output, determine at least transmit power spectrum shaping coefficients based on the attenuation measure and transmit the at least transmit power spectrum shaping coefficients to the subscriber device via the transmit data input of the transmit/receive modem.

12. The central office according to claim 11, wherein the at least power spectrum shaping coefficients includes power spectrum shaping coefficients and a modified attenuation measure, and wherein the transmit power spectrum adjuster is further operable to determine the modified attenuation measure and the transmit power spectrum shaping coefficients at least in part by solving an equation system according to $$\begin{bmatrix} -1 & -\sqrt{f_{ref,0,i}} \\ \vdots & \vdots \\ -1 & -\sqrt{f_{ref,N-1,i}} \end{bmatrix} \cdot \begin{bmatrix} A'_i \\ B'_i - kl'_0 \end{bmatrix} = U + kl_0 \cdot \sqrt{f_{ref,i}} - 10 \cdot \log\left(\frac{kl_0}{kl_{ref}}\right)$$

wherein $kl_0$ corresponds to the attenuation measure determined by and received from the subscriber device, $kl_0'$ corresponds to the modified attenuation measure and $A_i'$ and $B_i'$ corresponds to the shaping coefficients, and wherein $kl_{ref}$ corresponds to a reference attenuation and $f_{ref,i}=[f_{ref,0,i}, f_{ref,1,i}, \ldots, f_{ref,N-1,i}]^T$ corresponds to a reference frequency vector of a plurality of reference frequencies ($f_{ref,0,i}, f_{ref,1,i}, \ldots, f_{ref,N-1,i}$) and $U=[\text{UPBOPSD}(f_{ref,0,i}), \text{UPBOPSD}(f_{ref,1,i}), \ldots, \text{UPBOPSD}(f_{ref,N-1,i})]^T$ corresponds to a vector of values of a reference power spectrum at the reference frequencies of the plurality of reference frequencies.

13. The central office according to claim 11, wherein the transmit/receive modem is further configured to, responsive to the receipt of the attenuation measure from the subscriber device:

terminate a initialization phase of a transmission protocol with the subscriber device;

subsequently restart the initialization phase after determination of the shaping coefficients; and transmit the shaping coefficients or the modified attenuation measure and the shaping coefficients to the subscriber device.

14. A digital subscriber line communication network comprising a central office and a subscriber device, the central office comprising:

a transmit/receive modem comprising a transmit data input, a receive data output and an external interface which is capable of being coupled to a subscriber device via a line; and a transmit power spectrum adjuster comprising an input coupled to the receive data output, and an output coupled to the transmit data input, wherein the transmit power spectrum adjuster is operable to, responsive to receiving an attenuation measure from the receive data output, determine, based on the attenuation measure, at least transmit power spectrum shaping coefficients and to transmit the at least transmit power spectrum shaping coefficients to the subscriber device via the transmit data input of the transmit/receive modem, and wherein the subscriber device comprises a first state of transmitting the attenuation measure to the central office and a second state of anticipating the at least transmit power spectrum shaping coefficients from the central office, as well as state transitions, by which, up to a complete initialization of the connection setup between the central office and the subscriber device, among the first state and the second state the second state is passed through last.

15. The communication network according to claim 14, wherein the at least transmit power spectrum shaping coefficients comprises transmit power spectrum shaping coefficients and a modified attenuation measure, and wherein the transmit power spectrum adjuster of the central office is further operable to determine the transmit power spectrum shaping coefficients and the modified attenuation measure at least in part by solving an equation system according to $$\begin{bmatrix} -1 & -\sqrt{f_{ref,0,i}} \\ \vdots & \vdots \\ -1 & -\sqrt{f_{ref,N-1,i}} \end{bmatrix} \cdot \begin{bmatrix} A'_i \\ B'_i - kl'_0 \end{bmatrix} = U + kl_0 \cdot \sqrt{f_{ref,i}} - 10 \cdot \log\left(\frac{kl_0}{kl_{ref}}\right)$$

wherein $kl_0$ corresponds to the attenuation measure determined by and received from the subscriber device, $kl_0'$ corresponds to the modified attenuation measure and $A_i'$ and $B_i'$ corresponds to the shaping coefficients, and wherein $kl_{ref}$ corresponds to a reference attenuation and $f_{ref,i}=[f_{ref,0,i}, f_{ref,1,i}, \ldots, f_{ref,N-1,i}]^T$ corresponds to a reference frequency vector of a plurality of reference frequencies ($f_{ref,0,i}, f_{ref,1,i}, \ldots, f_{ref,N-1,i}$) and $U=[\text{UPBOPSD}(f_{ref,0,i}), \text{UPBOPSD}(f_{ref,1,i}), \ldots, \text{UPBOPSD}(f_{ref,N-1,i})]^T$ corresponds to a vector of values of a reference power spectrum at the reference frequencies of the plurality of reference frequencies.

16. The communication network according to claim 14, wherein the communication network includes a wire-bonded communication network.

17. The communication network according to claim 16, wherein the communication network includes an xDSL network.

18. The communication network according to claim 17, wherein the communication network includes a VDSL network.

19. A subscriber device for a digital subscriber line communication network comprising a central office, comprising a transmit/receive modem comprising a transmit data input, a receive data output, an external interface capable of being coupled to the central office via a line, and a transmit power spectrum adjustment input;

a state machine coupled to the transmit data input and the receive data output, comprising a transmit power spectrum adjustment output and a first state of anticipating a receipt of a test signal from the central office to the receive data output;

a second state of determining an attenuation measure based on the test signal and a transmission of the determined attenuation measure to the central office via the transmit data input;

a third state of anticipating a receipt of at least transmit power spectrum shaping coefficients from the central office at the receive data output and passing on the at least transmit power spectrum shaping coefficients to the transmit power spectrum adjustment output; and a transmit power spectrum adjuster comprising an input coupled to the transmit power spectrum adjustment output, and an output coupled to the transmit power spectrum adjustment input, wherein the state machine further comprises state transitions, by which, up to a complete initialization of a connection setup between central office and subscriber device, among the first to third states the third state is passed through last.

20. A subscriber device for a digital subscriber line communication network comprising a central office, comprising a transmit/receive modem comprising an adjustable transmit power spectrum for a communication with the central office;

a state machine for passing an initialization phase of a communication protocol with the central office, wherein the state machine is coupled to the transmit/receive modem and comprises a first state for anticipating a receipt of a test signal from the central office via the transmit/receive modem;

a second state for determining an attenuation measure based on the test signal and a transmission of the determined attenuation measure to the central office via the transmit/receive modem;

a third state for anticipating a receipt of at least transmit power spectrum shaping coefficients from the central office via the transmit/receive modem and passing on the at least transmit power spectrum shaping coefficients to the transmit power spectrum adjustment output; and state transitions, through which, up to the completion of the initialization phase, among the first to third states the third state is passed through last; and a transmit power spectrum adjuster for adjusting the transmit power spectrum of the transmit/receive modem on the basis of at least the transmit power spectrum shaping coefficients.

21. The subscriber device according to claim 20, wherein the subscriber device is configured to allow adjustment of the transmit power spectrum by a transmitter/receiver by means of a modified attenuation measure and shaping coefficients for a frequency-dependent shaping of the transmit power spectrum.

22. A method for adjusting a transmit power spectrum of a subscriber device of a digital subscriber line communication network, comprising:
receiving, from a subscriber device, an attenuation measure for an attenuation of a signal that occurs in transmission from the transmitter/receiver to a subscriber device of the digital subscriber line communication network connected to the transmitter/receiver;
determining a modified attenuation measure and shaping coefficients for a frequency-dependent shaping of the transmit power spectrum based on the attenuation measure received from the subscriber device; and
transferring the modified attenuation measure and the shaping coefficients to the subscriber device to be used by the subscriber device for adjusting the transmit power spectrum.

23. The method according to claim 22, wherein the determination of the shaping coefficients and the modified attenuation measure is based on a reference attenuation and a reference power spectrum.

24. The method according to claim 22, wherein the determination of the shaping coefficients and the modified attenuation measure includes solving an equation system according to $$\begin{bmatrix} -1 & -\sqrt{f_{ref,0,i}} \\ \vdots & \vdots \\ -1 & \sqrt{f_{ref,N-1,i}} \end{bmatrix} \cdot \begin{bmatrix} A'_i \\ B'_i - kl'_0 \end{bmatrix} = U + kl_0 \cdot \sqrt{f_{ref,i}} - 10 \cdot \log\left(\frac{kl_0}{kl_{ref}}\right)$$

wherein $kl_0$ corresponds to the attenuation measure determined by and received from the subscriber device, $kl_0'$ corresponds to the modified attenuation measure and $A_i'$ and $B_i'$ corresponds to the shaping coefficients, and wherein $kl_{ref}$ corresponds to a reference attenuation and $f_{ref,i}=[f_{ref,0,i}, f_{ref,1,i}, \ldots, f_{ref,N-1,i}]^T$ corresponds to a reference frequency vector of a plurality of reference frequencies ($f_{ref,0,i}$, $f_{ref,1,i}, \ldots, f_{ref,N-1,i}$) and
U=[UPBOPSD($f_{ref,0,i}$), UPBOPSD ($f_{ref,1,i}$), . . . , UPBOPSD($f_{ref,N-1,i}$)]$^T$ corresponds to a vector of values of a reference power spectrum at the reference frequencies of the plurality of reference frequencies.

25. The method according to claim 22, wherein transferring further includes terminating an initialization phase of a transmission protocol with the subscriber device after receiving the attenuation measure from the subscriber device, subsequently restarting the initialization phase after determining the modified attenuation measure and the shaping coefficients, transferring the modified attenuation measure and the shaping coefficients.

26. A method for adjusting a transmit power spectral density of a subscriber device of a digital subscriber line communication network, comprising:
determining, in a subscriber device, a measure for an attenuation of a signal that occurs during transmission from a transmitter/receiver to a subscriber device of the digital subscriber line communication network connected to the transmitter/receiver;
transferring the determined measure for the attenuation from the subscriber device to the transmitter/receiver;
determining a modified attenuation measure and shaping coefficients for a frequency-dependent shaping of the transmit power spectrum based on the attenuation measure received from the subscriber device;
transferring the modified attenuation measure and the modified shaping coefficients from the transmitter/receiver to the subscriber device; and
using the modified attenuation measure and the modified shaping coefficients for adjusting the transmit power density of the subscriber device.

27. The method according to claim 26, wherein the determination of the shaping coefficients and the modified attenuation measure includes solving an equation system according to $$\begin{bmatrix} -1 & -\sqrt{f_{ref,0,i}} \\ \vdots & \vdots \\ -1 & -\sqrt{f_{ref,N-1,i}} \end{bmatrix} \cdot \begin{bmatrix} A'_i \\ B'_i - kl'_0 \end{bmatrix} = U + kl_0 \cdot \sqrt{f_{ref,i}} - 10 \cdot \log\left(\frac{kl_0}{kl_{ref}}\right)$$

wherein $kl_0$ corresponds to the attenuation measure determined by and received from the subscriber device, $kl_0'$ corresponds to the modified attenuation measure and $A_i'$ and $B_i'$ corresponds to the shaping coefficients, and wherein $kl_{ref}$ corresponds to a reference attenuation and $f_{ref,i}=[f_{ref,0,i}, f_{ref,1,i}, \ldots, f_{ref,N-1,i}]^T$ corresponds to a reference frequency vector of a plurality of reference frequencies ($f_{ref,0,i}$, $f_{ref,1,i}, \ldots, f_{ref,N-1,i}$) and
U=[UPBOPSD($f_{ref,0,i}$), UPBOPSD ($f_{ref,1,i}$), . . . , UPBOPSD($f_{ref,N-1,i}$)]$^T$ corresponds to a vector of values of a reference power spectrum at the reference frequencies of the plurality of reference frequencies.

28. A method according to claim 27, wherein transferring the modified attenuation measure and the modified shaping coefficients farther includes terminating an initialization phase of a transfer protocol with the subscriber device after receiving the attenuation measure from the subscriber device, restarting the initialization phase after determining the modified attenuation measure and the shaping coefficients, and transferring the modified attenuation measure and the shaping coefficients.

29. A computer program comprising a program code for performing a method for adjusting a transmit power spectrum of a subscriber device of a digital subscriber line communication network when the computer program runs on a computer, comprising:
receiving, from the subscriber device, an attenuation measure for an attenuation of a signal that occurs in transmission from the transmitter/receiver to a subscriber device of the digital subscriber line communication network connected to the transmitter/receiver;
determining the modified attenuation measure and the shaping coefficients for a frequency-dependent shaping of the transmit power spectrum based on the attenuation measure determined by and received from the subscriber device; and
transferring the modified attenuation measure and the shaping coefficients to the subscriber device to be used by the subscriber device for adjusting the transmit power spectrum.

30. The computer program according to claim 29, wherein the program code is implemented such that in the method the determination of the shaping coefficients and the modified attenuation measure includes solving an equation system according to $$\begin{bmatrix} -1 & -\sqrt{f_{ref,0,i}} \\ \vdots & \vdots \\ -1 & -\sqrt{f_{ref,N-1,i}} \end{bmatrix} \cdot \begin{bmatrix} A'_i \\ B'_i - kl'_0 \end{bmatrix} = U + kl_0 \cdot \sqrt{f_{ref,i}} - 10 \cdot \log\left(\frac{kl_0}{kl_{ref}}\right)$$

wherein $kl_0$ corresponds to the attenuation measure determined by and received from the subscriber device, $kl_0'$ corresponds to the modified attenuation measure and $A_i'$ and $B_i'$ corresponds to the shaping coefficients, and wherein $kl_{ref}$ corresponds to a reference attenuation and $f_{ref,i} = [f_{ref,0,i}, f_{ref,1,i}, \ldots, f_{ref,N-1,i}]^T$ corresponds to a reference frequency vector of a plurality of reference frequencies ($f_{ref,0,i}, f_{ref,1,i}, \ldots, f_{ref,N-1,i}$) and
$U = [\text{UPBOPSD}(f_{ref,0,i}), \text{UPBOPSD}(f_{ref,1,i}), \ldots, \text{UPBOPSD}(f_{ref,N-1,i})]^T$ corresponds to a vector of values of a reference power spectrum at the reference frequencies of the plurality of reference frequencies.

31. The computer program according to claim 29, wherein the program code is implemented such that in the method transferring the modified attenuation measure and the modified shaping coefficients further includes terminating an initialization phase of the transfer protocol with the subscriber device after receiving the attenuation measure from the subscriber device, restarting the initialization phase after determining the modified attenuation measure and the shaping coefficients, and transferring the modified attenuation measure and the shaping coefficients.

* * * * *